(12) United States Patent
Algüera

(10) Patent No.: US 8,694,211 B2
(45) Date of Patent: Apr. 8, 2014

(54) METHOD AND CONTROL SYSTEM FOR A DISPLACEMENT DEVICE, TAKING INTO ACCOUNT THE RELATIVE ANGULAR POSITION OF A TRACTOR AND SEMI-TRAILER

(75) Inventor: José Manuel Algüera, Aschaffenburg (DE)

(73) Assignee: Jost-Werke GmbH (DE)

( * ) Notice: Subject to any disclaimer, the term of this patent is extended or adjusted under 35 U.S.C. 154(b) by 920 days.

(21) Appl. No.: 12/798,645

(22) Filed: Apr. 8, 2010

(65) Prior Publication Data
US 2010/0262338 A1 Oct. 14, 2010

(30) Foreign Application Priority Data
Apr. 9, 2009 (DE) .......................... 10 2009 002 334

(51) Int. Cl.
*B62D 53/08* (2006.01)
(52) U.S. Cl.
USPC ........................................... 701/48; 280/430
(58) Field of Classification Search
USPC .............. 701/300, 301, 48–50; 180/274, 275; 280/412, 430, 432, 438.1, 446.1, 447
See application file for complete search history.

(56) References Cited

U.S. PATENT DOCUMENTS

| | | | |
|---|---|---|---|
| 8,010,252 B2 * | 8/2011 | Getman et al. ................... 701/37 |
| 8,333,399 B2 * | 12/2012 | Brown et al. ................ 280/438.1 |
| 2004/0181338 A1 * | 9/2004 | Dobler et al. .................. 701/301 |
| 2007/0152424 A1 * | 7/2007 | Deng et al. ..................... 280/432 |
| 2008/0036173 A1 * | 2/2008 | Alguera ......................... 280/407 |
| 2009/0072515 A1 * | 3/2009 | Alguera et al. .............. 280/441.1 |
| 2009/0160159 A1 * | 6/2009 | Alguera ...................... 280/438.1 |
| 2010/0109278 A1 * | 5/2010 | Treude et al. ........... 280/137.502 |
| 2011/0156368 A1 * | 6/2011 | Brown et al. ............... 280/438.1 |

FOREIGN PATENT DOCUMENTS

| DE | 10 2004 045 662 A1 | 3/2006 |
|---|---|---|
| DE | 10 2005 060 124 A1 | 6/2007 |
| DE | 10 2007 031 318 A1 | 4/2008 |

* cited by examiner

*Primary Examiner* — Jason Holloway
(74) *Attorney, Agent, or Firm* — Hudak, Shunk & Farine Co. LPA

(57) ABSTRACT

A method and a system for controlling a displacement device for a fifth wheel coupling disposed on a tractor vehicle are described, wherewith the displacement device has a lower structure having at least one guide rail oriented in the direction of travel, a movable carriage which supports the fifth wheel coupling and engages the guide rail(s), and a control device connected to a motorized drive unit for displacing the carriage and also connected to an adjusting member for fixing the carriage with respect to the guide rail(s); wherewith a measurement is made for determining the angle between the tractor and semi-trailer, the measurement signal is converted in the control device to a control signal, and thereby an operation of the motorized drive unit and/or the adjusting member is initiated. The underlying problem of the invention was to devise a method and a control system which minimize the risk of the semi-trailer striking against the cab of the tractor. One way in which this problem is solved according to the invention is that, from the measurement signal, an angular or distance timewise rate of change is generated in the control device, or such a timewise rate of change is transmitted to the control device.

20 Claims, 3 Drawing Sheets

Fig. 1 (state of the art)
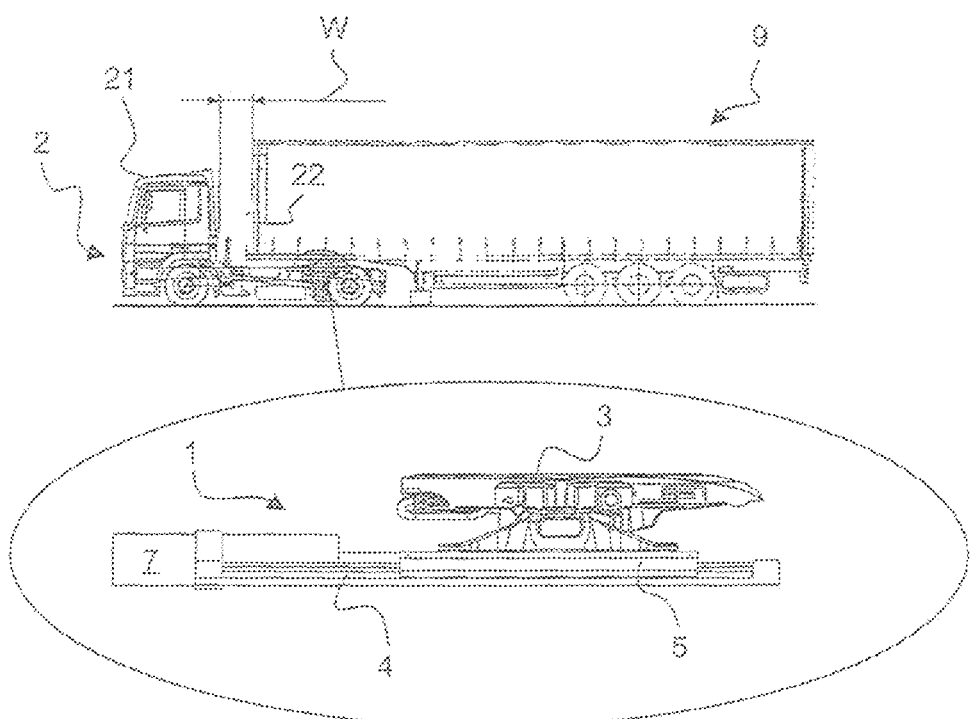
Fig. 2 (state of the art)
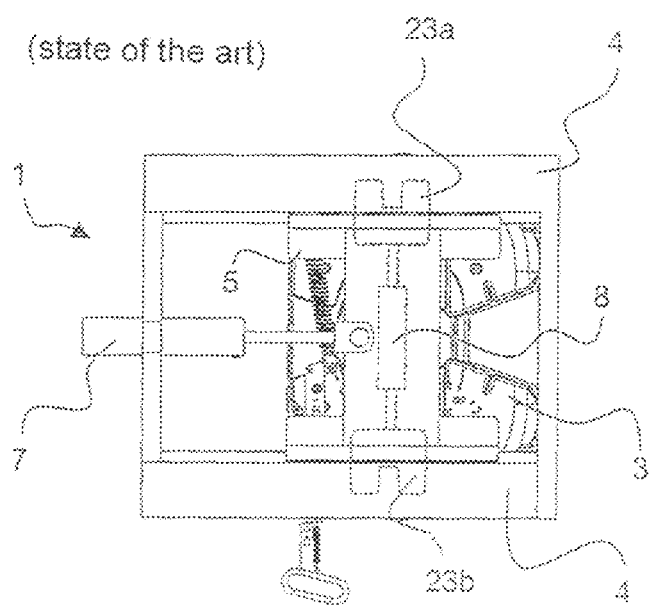

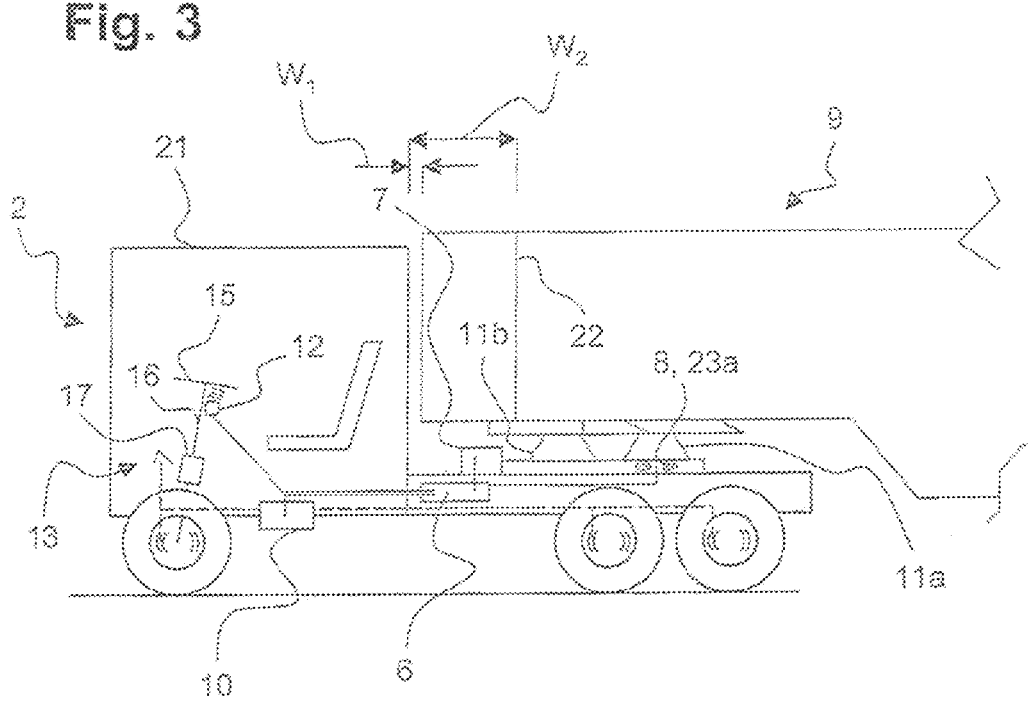
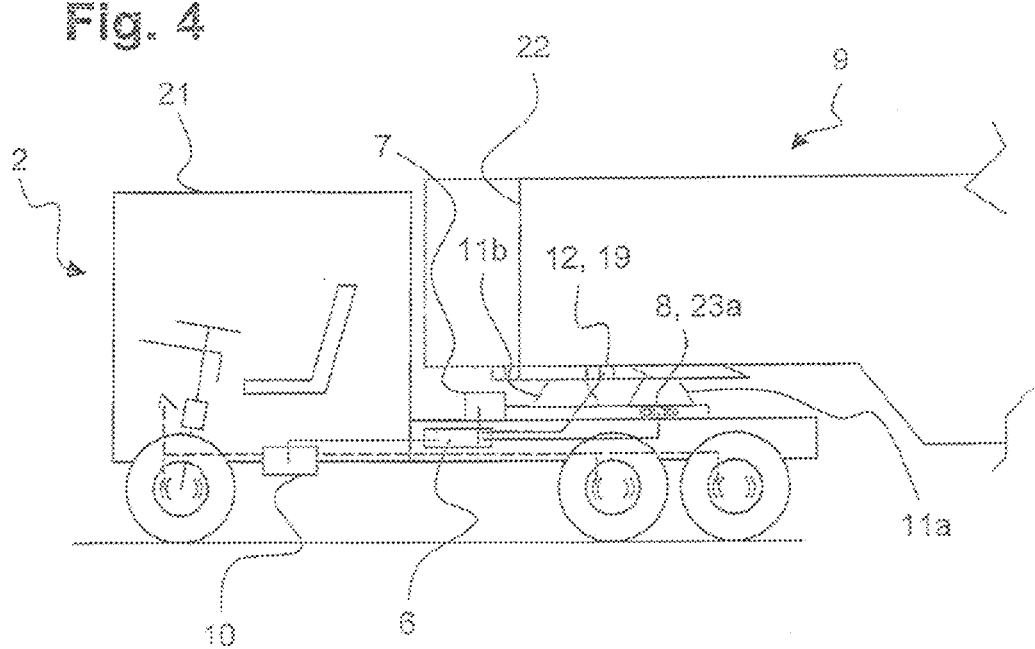

METHOD AND CONTROL SYSTEM FOR A DISPLACEMENT DEVICE, TAKING INTO ACCOUNT THE RELATIVE ANGULAR POSITION OF A TRACTOR AND SEMI-TRAILER

FIELD OF INVENTION

The invention relates to a method of controlling a displacement device for a fifth wheel coupling disposed on a tractor vehicle, according to the features set forth in the claims. Also proposed is a control system for a displacement device, which control system is particularly well suited for carrying out the inventive method.

BACKGROUND OF THE INVENTION

A known displacement device of the general type under consideration is disclosed in DE 10 2005 060124 A1. With the aid of a motorized drive unit, a carriage bearing the fifth wheel coupling can be displaced along the longitudinal axis of the vehicle on two parallel guide rails, and can be locked in a prescribed position. When the vehicle is traveling at high Autobahn speeds without intense curves, it is contemplated that the fifth wheel coupling will be disposed maximally close to the tractor cab, wherewith the gap between the cab and the front of the semi-trailer will be held at its minimum length, and under this regime vortices will be minimized. According to the cited known patent application, the control device for the displacement device is connected to the vehicle control system, so that information about vehicle speed can be retrieved and thus in normal operation the gap between the tractor and the semi-trailer can be adjusted. However, the problem occurs that if the vehicle attempts to negotiate a relatively narrow radius curve, there is the risk that swinging of the semi-trailer suspended on the tractor will result in a corner of the semi-trailer striking against the tractor cab. This problem can also arise in a situation of emergency panic braking, i.e. sudden breaking without a compensating steering maneuver; in such a situation it would be desirable if a braking signal were supplied to the control device, wherewith the braking signal could be evaluated and could be converted into a very rapid backward displacement of the carriage, so as to lengthen the gap between the tractor and semi-trailer.

A different state of the art is disclosed in DE 10 2004 045662 A1, which proposes a displacement device wherein a position sensor determines the position of a carriage. The signal from the position sensor is sent to a control device which may cause the displacement device to be engaged, thereby moving the carriage rearward, when the gap between the tractor cab and the front of the semi-trailer becomes too short.

However, in practice it is found that the determination of a braking signal and a vehicle speed are suitable only for determining a panic braking maneuver without a subsequent compensating maneuver. Under these circumstances it is generally satisfactory for the gap between the tractor and semi-trailer to remain unchanged, even if the fifth wheel coupling is in a forward-most position. If panic braking is accompanied by a simultaneous compensating steering maneuver, frequently this will lead to a corner of the semi-trailer striking against the cab of the tractor; the known device will not detect such a hazard. In a situation of a sharp load shifting reaction of the semi-trailer or when additional equipment is disposed on the front side of the semi-trailer, the known means of determination of the gap via determination of the position of the carriage are imprecise, introducing an additional factor of uncertainty as whether the semi-trailer can swing freely without striking against the rear of the tractor.

DE 10 2007 031318 A1 describes a device for changing the distance between a tractor and a semi-trailer coupled to the tractor, wherewith the distance is automatically adjusted depending on the speed and/or depending on the angle between the longitudinal axis of the tractor and the longitudinal axis of the semi-trailer. It is proposed that the maximum permissible speed-dependent tractor/semi-trailer angle should depend upon the steering angle of the steerable wheels of the tractor, or correspondingly should depend upon the angle of the steering wheel in the tractor. In the case of panic braking, the determination of the steering angle and the calculation of the resulting tractor/semi-trailer angle is poorly suited to avoid a collision of a semi-trailer with the tractor cab. If the vehicle is traveling at high speed, and while it is negotiating a long curve it encounters an obstacle, under some circumstances the driver must change the steering to "straight ahead" steering angle 0°, even though at the same time the actual tractor/semi-trailer angle may be 20-30°. With the known device, the semi-trailer will be drawn toward the tractor cab, which will lead to a collision. With the known device a given steering angle may be associated with a number of tractor/semi-trailer angles, depending on how far the vehicle has advanced into the curve. If the driver has maintained a given steering angle over a relatively long time interval, any of a variety of tractor/semi-trailer angles may have established itself. Conversely, a given tractor/semi-trailer angle may correspond to a variety of steering angles. As a result of this indefinite relationship between the steering angle and the tractor/semi-trailer angle, the speed-dependent steering angle is not suitable as a signal for controlling the displacement of the coupling.

SUMMARY OF THE INVENTION

Accordingly, the underlying problem of the invention was to devise a method and a control system which minimize the risk of a semi-trailer striking against the cab of the associated tractor during panic braking and/or a sudden avoidance maneuver.

This problem is solved according to the invention by a method wherein, from the measurement angle, an angular or distance timewise rate of change is generated in the control device, or such a timewise rate of change is transmitted to the control device, and the fifth wheel coupling is displaced depending on said angular or distance timewise rate of change.

The term "tractor/semi-trailer angle" is understood to mean a nonzero angle between the longitudinal axis of the tractor and the longitudinal axis of the semi-trailer. In customarily used displacement devices, the carriage is displaced by a motorized drive unit, e.g. a hydraulic cylinder, and after it reaches the prescribed position it is fixed on both sides to the guide rails. The organ of movement is usually a pneumatic or hydraulic cylinder, which moves locking pieces in the direction of the guide rails, which locking pieces come to be form-interlockingly engaged with said guide rails. The motorized drive unit releases this locked condition of the carriage on the guide rails under circumstances of, e.g. in particular, strong braking or collisions.

Instead of a form-interlocking lock mechanism, it is also possible for the motorized drive unit to be appropriately dimensioned such that one can dispense with additional form-interlocking elements. With such an embodiment, the "adjusting member" will be understood to comprise a shutoff valve which traps the fluid present in the interior of the cylinder.

When the vehicle is traveling at high Autobahn speeds, the semi-trailer will be drawn close to the tractor cab, by means of the displacement device, wherewith the gap between the cab and the front of the semi-trailer will be held at its minimum length. This will minimize vortex formation and thereby will minimize fuel consumption. In the event of a sudden steering maneuver, the fixing of the carriage will be released, and the carriage will be displaced rearward on the guide rails, so that when regions of the semi-trailer come close to the tractor cab the carriage will have been displaced somewhat rearwardly to a rearward position.

The time rate of change of the angle or in the case of distance measurement, the time rate of change of the distance from the cab to the semi-trailer takes into account, during the driving, a change in the turning angle or a change in the measured value from the sensor per unit time, in order to thereby directly set the gap length. The terms "time rate of change of the angle" and "time rate of change of the distance" are used interchangeably, and represent only two of the possible measurement values which may be used. In this contemplated method, it is unnecessary to know the actual current value of the tractor/semi-trailer angle and thereby the position of the fifth wheel coupling on the guide rails. With the aid of this step of the method one can determine in advance whether the turning deflection brought about by the driver occurred as a result of travel along a long curve in the course of normal driving or whether it resulted from a sudden rapid avoidance maneuver.

It has been found to be particularly advantageous to generate a signal representing the time rate of change of braking, from the braking signal of the vehicle braking system, or to determine such time rate of change of braking value at the control device. The time rate of change of braking serves as a parameter to ascertain whether the driver is applying strong or weak braking action. The underlying parameter of this may be e.g. the brake pressure or the brake pedal movement per unit time.

The available vehicle brake pedal excursion may be determined using two sensors, disposed at the start and end of the pedal excursion path, respectively. In the event of sudden panic braking, the driver will depress the brake pedal rapidly in order to avoid a threatened accident. The brake pedal will be moved rapidly, and there will be a correspondingly high time rate of change of braking.

When a prescribed value of the time rate of change of the braking is exceeded, and the time rate of change of the angle falls below a prescribed value, the carriage may permissibly be locked, by the adjusting member. This set of circumstances corresponds to the scenario of full braking of the vehicle without appreciable steering movement. If the semi-trailer is close to the tractor cab as a result of load shift reactions, a collision of the semi-trailer with the cab may be expected. For this reason, the adjusting member is left in the locking position, and if the locking position is maintained by form-interlocking engagement an additional level of safety and security is provided because the carriage is not held in place solely by the motorized drive unit. Preferably, the utilization of the above-described parameters may also be used to put the relevant safety systems into readiness mode. Thus, e.g., the hydraulic pump for the motorized drive unit can be started up or speeded up, in order to prudently have available a sufficiently high operating pressure.

Advantageously, when the time rate of change of the braking exceeds a prescribed value and the time rate of change of the tractor/semi-trailer angle exceeds a prescribed value, the locked status of the carriage is released by the adjusting member. Under this scenario, when full braking is exerted there is a sudden steering maneuver by the driver, e.g. to avoid an obstacle. In order to avoid a collision of the front of the semi-trailer with the tractor cab, the carriage must be brought to a rearward position on the guide rails, thereby increasing the length of the gap between the front of the semi-trailer and the tractor cab. For this to occur, it is necessary initially to release the locked status of the carriage.

Advantageously, the actual current speed of the tractor will also be input into the control device, wherewith if this value is below a prescribed minimum speed, the carriage will be held in a rearward position on the guide rail(s). This method step avoids continual movement of the carriage when the vehicle is traveling at low speed or is in maneuvering mode e.g. in very low speed maneuvering at a loading dock. Under these circumstances, air resistance is not a factor that needs to be taken into account. Further, when the vehicle is stopped or in maneuvering mode, one would like to prevent any unintentional rearward movement of the semi-trailer which might cause damage to vehicles, buildings, or other objects which are located behind the semi-trailer.

The invention is also realized in a control system wherein the control device calculates a time rate of change of an angle or a distance, from changes in a measured quantity.

According to a first advantageous embodiment, the sensor is disposed in the region of the steering system, and senses the steering angle of the tractor vehicle. From the steering angle of the tractor vehicle, the tractor/semi-trailer angle can then be determined indirectly. This arrangement is particularly preferred, because the system is provided with a signal from the sensor very early, i.e. immediately at the time of a steering action. In this connection, the sensor can interact with the steering wheel and/or steering shaft column and/or the steering drive.

According to a second preferred embodiment of the invention, the sensor senses the relative angle between the tractor and the semi-trailer. A suitable sensor for this purpose may be, e.g., an angle measuring device. The angle measuring device may be disposed, e.g., on or in the fifth wheel coupling. E.g., a free-turning roller may be applied against the underside of the semi-trailer plate, to determine the lateral deflection of the semi-trailer. It is also possible to sense rotational movement of the main pivot in the fifth wheel coupling.

According to a third embodiment, the sensor may comprise a distance sensor for sensing the length of the gap between the tractor cab and the front of the semi-trailer, wherewith the tractor/semi-trailer angle is determined as a function of the reduction of that gap length. When the vehicle is traveling straight ahead, the longitudinal axis of the tractor is in alignment with that of the semi-trailer. A distance sensor which is aligned, e.g. centrally, will measure a maximum distance. As soon as the vehicle enters a curve, the corner of the semi-trailer which is interior to the curve will move in the direction of the longitudinal axis of the tractor, so that the distance sensor will measure a reduced distance between the tractor cab and the front of the semi-trailer.

The above-described embodiment provides a particularly direct measurement, which particularly reflects the actual spatial situation. Also, the described use of a distance sensor can be used in ordinary operation to maintain a minimum distance between the cab and the semi-trailer.

In a special case it may be that the distance from the main pivot of the semi-trailer to the front of the semi-trailer may be very long, and moreover additional equipment may be installed on the front of the semi-trailer. In such a case, the distance sensor will serve to prevent a situation where the semi-trailer is drawn against the tractor cab in regular travel at high Autobahn speeds.

It has also been found to be advantageous if the control device is connected to the braking system of the tractor, wherewith a signal representing the time rate of change of the braking is received by the control device from the braking system, or is generated by the control device.

Advantageously, when a prescribed time rate of change of the braking is exceeded and the time rate of change of an angle falls below a prescribed value, the carriage is locked in place by the adjusting member.

Advantageously, when a prescribed time rate of change of the braking is exceeded and a prescribed time rate of change of an angle is also exceeded, the locked status of the carriage is released.

BRIEF DESCRIPTION OF THE DRAWINGS

For the sake of better understanding, the invention will be described in more detail hereinbelow, with reference to the 6 Figures.

FIG. 1 is a lateral view of a tractor with a displacement device, and a semi-trailer coupled to the tractor, according to the state of the art;

FIG. 2 is a bottom view of the displacement device illustrated in FIG. 1;

FIG. 3 is a schematic lateral view of a first embodiment of the inventive control system;

FIG. 4 is a schematic lateral view of a second embodiment of the inventive control system;

DETAILED DESCRIPTION OF THE INVENTION

Figure 5:
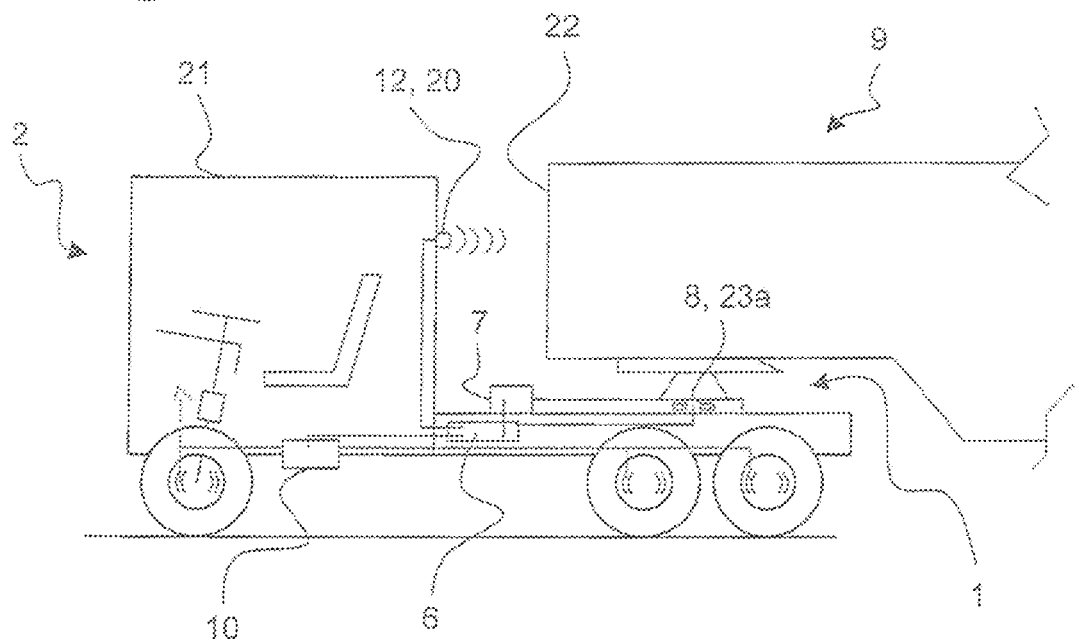
FIG. 5 is a schematic lateral view of a third embodiment of the inventive control system.

FIG. 1 is a schematic lateral view of a tractor and semi-trailer combination having a tractor 2 and a semi-trailer 9 which trailer is mechanically coupled to the tractor. The mechanical link between the vehicle elements 2 and 9 occurs via a "fifth wheel coupling" 3 which is disposed on a sliding carriage 5 and can be moved along the vehicle axis on two parallelly disposed guide rails 4 which are a distance apart. The coupling 3 is moved, during operation of the vehicle, by means of a special mechanical drive unit 7 in the form of a hydraulic cylinder, which has as a principal purpose the adjustment of the length of the gap W between the rear of the tractor housing 21 and the front of the trailer 22.

The displacement device 1 is seen in an enlarged bottom view in FIG. 2. An adjusting member 8 disposed perpendicularly to the guide rails 4 is disposed on the carriage 5; locking pieces 23a, 23b which form-interlockingly engage complementary receiving members (not shown) associated with the guide rails 4 are disposed at the ends of member 8, serving to fix the carriage 5 on the guide rails 4 Before the carriage 5 is moved by the motorized drive unit 7, the locking pieces 23a, 23b are retracted by the adjusting member 8, thereby releasing the mechanical locking.

A first embodiment of the invention is illustrated in FIG. 3. Here, in the tractor cab 21, a steering wheel 15 associated with a steering system 13 is monitored by a sensor 12, which measures a turning movement change in the steering angle (see FIG. 6). Alternatively, the sensor 12 can detect angular changes in the steering shaft 16 or parts of the steering drive system 17. The sensor 12 is connected to an electronic control device 6 which is also connected to the motorized drive unit 7 and the adjusting member 8. With the aid of the control device 6 and the sensor 12, an indirect determination of the relative angular position of the tractor 2 and semi-trailer 9 is made.

In FIG. 3, a rearward position 11a and a frontward position 11b of the carriage 5 and thereby of the front 22 of the semi-trailer can be seen. For the sake of conventional graphic readability, the frontward position 11b is represented in dotted lines. The frontward position 11a corresponds to the minimum gap length $W_1$ and the rearward position 11b corresponds to the maximum gap length $W_2$. The size of the minimum gap length $W_1$ is set in such a way that with this gap length it would not be possible to fully swing the front 22 of the semi-trailer without collision with the tractor cab 21.

Starting from the minimum gap length $W_1$, set for operation at high vehicle speed, if a steering deviation occurs, the value of $W_1$ is determined by the sensor 12 and this is made available to the control device 6 as a measured value. Depending on the "angle rate of change", i.e. the steering deviation per unit time, if a prescribed timewise rate of change of the angle is exceeded the adjusting member 8 is retracted and the carriage 5 is unlocked. Then the motorized drive unit 7 forces the carriage into the rearward position 11a, so as to maximize the gap length $W_2$.

System safety can be enhanced if additionally signals from the vehicle brake system 10 are taken into account. In this way, in the event that only a braking signal is present, the control device 6 can retain the locking of the carriage 5, and can shift the motorized drive unit 7 and the adjusting member 8 into readiness mode.

An alternative means of determining the relative angular position is illustrated in a control system according to FIG. 4. Here the sensor 12 is in the form of a rotational angle sensor 19 disposed in the contour of the fifth wheel coupling, to detect a change in the relative angle between the tractor 2 and the semi-trailer 9. The rotational angle sensor 19 is connected directly to the control device 6, which from the supplied signal indirectly determines the relative angle between the tractor 2 and the semi-trailer 9 from the relative angle 18 (FIG. 6).

Figure 6:
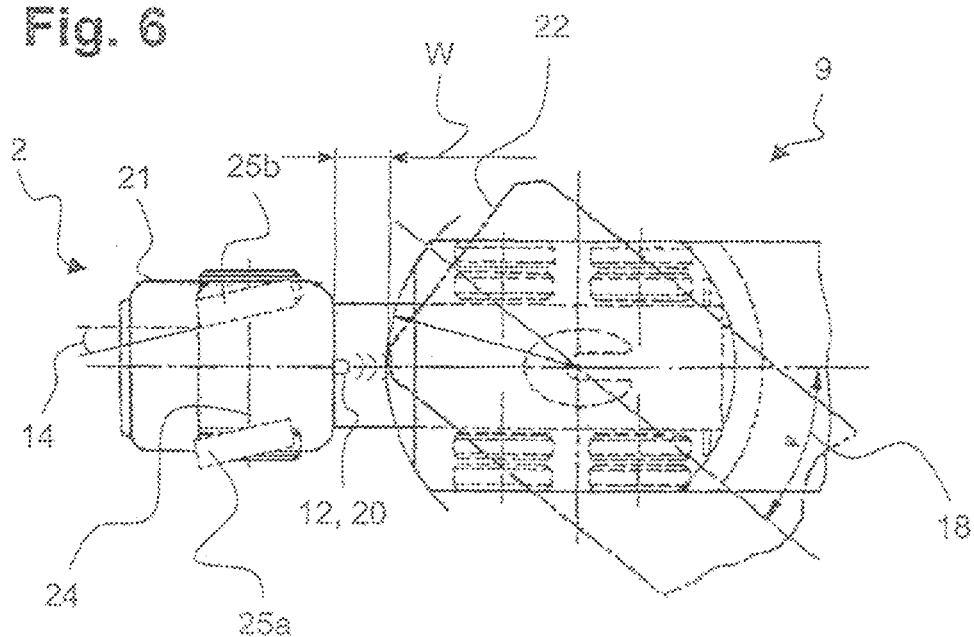
FIG. 6 is a schematic lateral view of the control system illustrated in FIG. 5.

FIGS. 5 and 6 illustrate a second alternative embodiment of the invention, wherein the sensor 12 is comprised of a distance sensor 20 disposed on the rear wall of the tractor cab 21. If a single distance sensor 20 is used, it should be disposed centrally in the region of the longitudinal center axis of the tractor 2 as seen particularly well in FIG. 6.

FIG. 6 illustrates the end of negotiation of a curve, wherewith the wheels 25a, 25b of the front axle 24 are turned at a steering angle 14 with respect to straight line travel. The corner of the semi-trailer front 22 which is interior to the curve is in the region of the longitudinal center axis of the tractor 2, and thus is directly opposite to the distance sensor 20. In this position, the distance sensor measures the shortest possible gap length W. If the tractor then begins to travel straight ahead, wherewith the semi-trailer 9 will swing back into straight alignment, the distance sensor 20 will determine the longest possible gap length W. If the vehicle goes into curve travel in the opposite curve direction, the distance sensor 20 will determine gap lengths W analogously.

Thus the control device 6, using the measurement value from the distance sensor 20, will indirectly determine the angular position corresponding to the relative angle 18 between the semi-trailer 9 and the tractor 2.

LIST OF REFERENCE NUMERALS

1 Displacement device
2 Tractor vehicle

3 Fifth wheel coupling
4 Guide rail
5 Carriage
6 Control device
7 Motorized drive unit
8 Adjusting member
9 Semi-trailer
10 Vehicle braking system
11a Rearward position of the carriage
11b Forward position of the carriage
12 Sensor
13 Steering system
14 Steering angle
15 Steering wheel
16 Steering shaft
17 Steering drive
18 Relative angle
19 Rotational angle sensor
20 Distance sensor
21 Tractor cab
22 Front of the semi-trailer
23a,23b Locking pieces on/of the adjusting member
24 Front axle
25a,25b Wheels
W Length of the gap between the tractor and the semi-trailer
$W_1$ Minimum gap length
$W_2$ Maximum gap length

What is claimed is:

1. A method of controlling a displacement device for a fifth wheel coupling disposed on a tractor vehicle, wherewith the displacement device comprises: a lower structure having at least one guide rail oriented in the direction of travel, a movable carriage which supports the fifth wheel coupling and engages the guide rail(s), and a control device connected to a motorized drive unit configured to displace the carriage and also connected to an adjusting member configured to fix the carriage with respect to the guide rail(s); comprising the steps of: making a measurement configured to determine an angle between the tractor and semi-trailer, generating in the control device, from the measurement signal, i) a time rate of change of an angle or ii) a time rate of change of a distance between the tractor vehicle and the semi-trailer, or iii) generating a time rate of change of angle or distance and transmitting the time rate of change of angle or distance to the control device, and converting the measurement signal in the control device to a control signal, and thereby initiating an operation of the motorized drive unit and/or the adjusting member.

2. The method according to claim 1; wherein a time rate of change of braking is generated in the control device from a braking signal from a vehicle braking system, or the time rate of change of braking is otherwise generated from the vehicle braking system.

3. The method according to claim 2; wherein the carriage is locked in place by the adjusting member if the time rate of change of the braking is above a prescribed value and the time rate of change of an angle between the tractor and semi-trailer is below a prescribed value.

4. The method according to claim 2; wherein a locked condition of the carriage is released by the adjusting member if the time rate of change of the braking is above a prescribed value and the time rate of change of the angle between the tractor and semi-trailer is also above a prescribed value.

5. The method according to claim 4; wherein after the locked condition of the carriage is released, the carriage is displaced by the drive unit into a rearward position.

6. The method according to claim 1; wherein the control device develops a signal corresponding to an actual speed of the tractor, and, if an absolute value of the speed is below a prescribed minimum value, the carriage is held in place in a rearward position on the guide rail(s).

7. A control system comprised of:
a displacement device for a fifth wheel coupling disposed on a tractor vehicle, which device is comprised of: a lower structure having at least one guide rail oriented in the direction of travel, a movable carriage which supports the fifth wheel coupling and engages the guide rail(s), and a control device connected to a motorized drive unit configured to displace the carriage and the control device is also connected to an adjusting member configured to fix the carriage with respect to the guide rail(s); wherewith the control device is connected to at least one sensor which generates a measurement value configured to determine the angle between the tractor and semi-trailer, wherein the control device calculates a value corresponding to a time rate of change of an angle or the time rate of change of a distance between the tractor vehicle and the semi-trailer, from the change in the measurement value, and said control device operates the drive unit and/or the adjusting member.

8. The control system according to claim 7; wherein the sensor is disposed in the region of a steering system, and determines a steering angle of the tractor vehicle.

9. The control system according to claim 7; wherein the sensor cooperates with a steering wheel and/or a steering shaft and/or a steering drive.

10. The control system according to claim 7; wherein the sensor determines a relative angle between the tractor and the semi-trailer.

11. The control system according to claim 10; wherein the sensor is a rotational angle sensor.

12. The control system according to claim 7; wherein the sensor is a distance sensor for determining a length of a gap (W) between the cab of the tractor and the front of the semi-trailer, and said sensor determines the value of the angle between the tractor and semi-trailer by determining the reduction in the length of the gap (W).

13. The control system according to claim 7; wherein the control device is connected to a braking system of the tractor, and receives a value of the time rate of change of braking from the braking system, or the control device generates said value.

14. The control system according to claim 13; wherein the carriage is locked in place by the adjusting member if the time rate of change of the braking is above a prescribed value and the time rate of change of the angle between the tractor and semi-trailer is below a prescribed value.

15. The control system according to claim 13; wherein a locked condition of the carriage is released if the time rate of change of the braking is above a prescribed value and the time rate of change of a certain angle is also above a prescribed value.

16. The method according to claim 3; wherein a locked condition of the carriage is released by the adjusting member if the time rate of change of the braking is above a prescribed value and the time rate of change of the angle between the tractor and semi-trailer is also above a prescribed value.

17. The method according to claim 16, wherein after the locked condition of the carriage is released, the carriage is displaced by the drive unit into a rearward position.

18. The method according to claim 17; wherein the control device develops a signal corresponding to an actual speed of the tractor, and, if an absolute value of the speed is below a prescribed minimum value, the carriage is held in place in a rearward position on the guide rail(s).

19. The control system according to claim 8; wherein the sensor cooperates with a steering wheel and/or a steering shaft and/or a steering drive.

20. The control system according to claim 14; wherein a locked condition of the carriage is released if the time rate of change of the braking is above a prescribed value and the time rate of change of a certain angle is also above a prescribed value.

* * * * *